United States Patent
Dussud et al.

(10) Patent No.: US 7,822,938 B2
(45) Date of Patent: Oct. 26, 2010

(54) SYSTEM AND METHOD FOR PERFORMING GARBAGE COLLECTION BASED ON UNMANAGED MEMORY ALLOCATIONS

(75) Inventors: Patrick H. Dussud, Bellevue, WA (US); Christopher S. George, Issaquah, WA (US); Gang Peng, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1276 days.

(21) Appl. No.: 10/969,301

(22) Filed: Oct. 20, 2004

(65) Prior Publication Data

US 2006/0085494 A1 Apr. 20, 2006

(51) Int. Cl.
*G06F 12/00* (2006.01)

(52) U.S. Cl. .............................. 711/170; 707/E12.009; 707/E12.012; 707/813; 707/999.206

(58) Field of Classification Search ................. 711/170; 707/E12.009, E12.012, 813, 999.206
See application file for complete search history.

(56) References Cited

U.S. PATENT DOCUMENTS 6,065,020 A * 5/2000 Dussud ........................ 707/206
6,300,962 B1 * 10/2001 Wishoff et al. ............... 345/543

2004/0216130 A1 * 10/2004 Keller et al. ................. 719/315

OTHER PUBLICATIONS

Microsoft Computer Dictionary, Copyright 1999, Fourth Edition, p. 28.*

* cited by examiner

*Primary Examiner*—Hong Kim
*Assistant Examiner*—Midys Rojas
(74) *Attorney, Agent, or Firm*—Microsoft Corporation

(57) ABSTRACT

The techniques and mechanisms described herein are directed to a method for performing garbage collection based on the total memory consumed by managed objects on a heap. The total memory includes heap memory and unmanaged memory. The garbage collector accepts input that indicates the amount of unmanaged memory and associates this amount with the managed object. The garbage collector then adjusts a collection strategy for the managed object based on the input. The input is sent to the garbage collector if the allocated amount meets a certain criteria in comparison with the size of the managed object on the heap. The amount may be automatically disassociated with the managed object when the managed is destroyed or the garbage collector may receive another input that removes the amount from being associated with the managed object.

25 Claims, 5 Drawing Sheets

US 7,822,938 B2

SYSTEM AND METHOD FOR PERFORMING GARBAGE COLLECTION BASED ON UNMANAGED MEMORY ALLOCATIONS

TECHNICAL FIELD

This document generally relates to memory management in a computer system, and more particularly, to a garbage collection process that manages the memory in a computer system.

BACKGROUND

Garbage collection, also commonly referred to as automatic memory management, attempts to automatically recycle dynamically allocated memory. Dynamically allocated memory is memory that is created at runtime and that is stored in an area of memory commonly referred to as the heap. There are several techniques that have been developed to perform garbage collection.

Each technique uses a collection strategy for determining when an object on the heap should best be recycled. Hereinafter, objects within the heap are referred to as managed objects. One collection strategy collects the managed objects based on the size (e.g., amount of memory) of the managed object. For example, this collection strategy may decide to clean up resources associated with a larger managed object earlier than a smaller managed object because collecting the larger managed object will free up more memory. Thus, by implementing a collection strategy that collects larger managed objects earlier than the smaller managed objects, the collection strategy minimizes the number of times the garbage collection process needs to run. This is beneficial because running the garbage collection process consumes resources and causes other programs to experience execution delays.

However, one problem with this collection strategy is that small managed objects may actually reference large amounts of unmanaged memory. Then, because the garbage collector bases its strategy on the size of the managed object, the garbage collector may wait to recycle these small managed objects until later. This is undesirable because each process is allowed a predetermined amount of total memory. The predetermined amount of total memory includes managed memory and unmanaged memory. Therefore, in order to efficiently manage its memory, the garbage collector may initiate a collection process more frequently on its larger objects with less success than if it had initiated the collection process on the smaller objects referencing large amounts of unmanaged memory.

In order to overcome this limitation, modules can directly invoke the garbage collection process on their own objects. Thus, by directly invoking the garbage collection process on its own small objects that reference large amounts of unmanaged memory, the garbage collection process can force the de-allocation of the unmanaged memory when it destroys the small objects. While this successfully overcomes the problem and recycles the smaller objects that may not have been automatically chosen for recycling, it is potentially very inefficient. For example, a module may consider that the allocation of one mega-byte of memory is a large amount and may directly invoke the garbage collector to recycle the object right away. However, the garbage collector may view this one megabyte allocation as inconsequential given a heap size of 1 Gbytes. These inefficiencies multiply when multiple modules each directly invoke the garbage collector. When this occurs, the garbage collection process may consume a large percentage of the computing resources and cause undesirable delays to other executing processes.

Thus, until now, there has not been a satisfactory solution for performing garbage collection when large allocations of unmanaged memory exist.

SUMMARY

The techniques and mechanisms described herein are directed to a method for performing garbage collection based on the total memory consumed by managed objects on a heap. The total memory includes heap memory and unmanaged memory. The garbage collector accepts input that indicates the amount of unmanaged memory and associates this amount with the managed object. The garbage collector then adjusts a collection strategy for the managed object based on the input. The input is sent to the garbage collector if the allocated amount meets a certain criteria in comparison with the size of the managed object on the heap. The amount may be automatically disassociated with the managed object when the managed object is destroyed or the garbage collector may receive another input that removes the amount from being associated with the managed object.

BRIEF DESCRIPTION OF THE DRAWINGS

Non-limiting and non-exhaustive embodiments are described with reference to the following figures, wherein like reference numerals refer to like parts through-out the various views unless otherwise specified.

DETAILED DESCRIPTION

Briefly, the present system and method increases the efficiency of garbage collection when managed objects reference unmanaged memory. This is achieved by communicating information about the amount of unmanaged memory to the garbage collector. The garbage collector then uses this information when determining which managed objects to collect. These and other advantages will become clear after reading the following detailed description.

Exemplary Computing Environment

Figure 1:
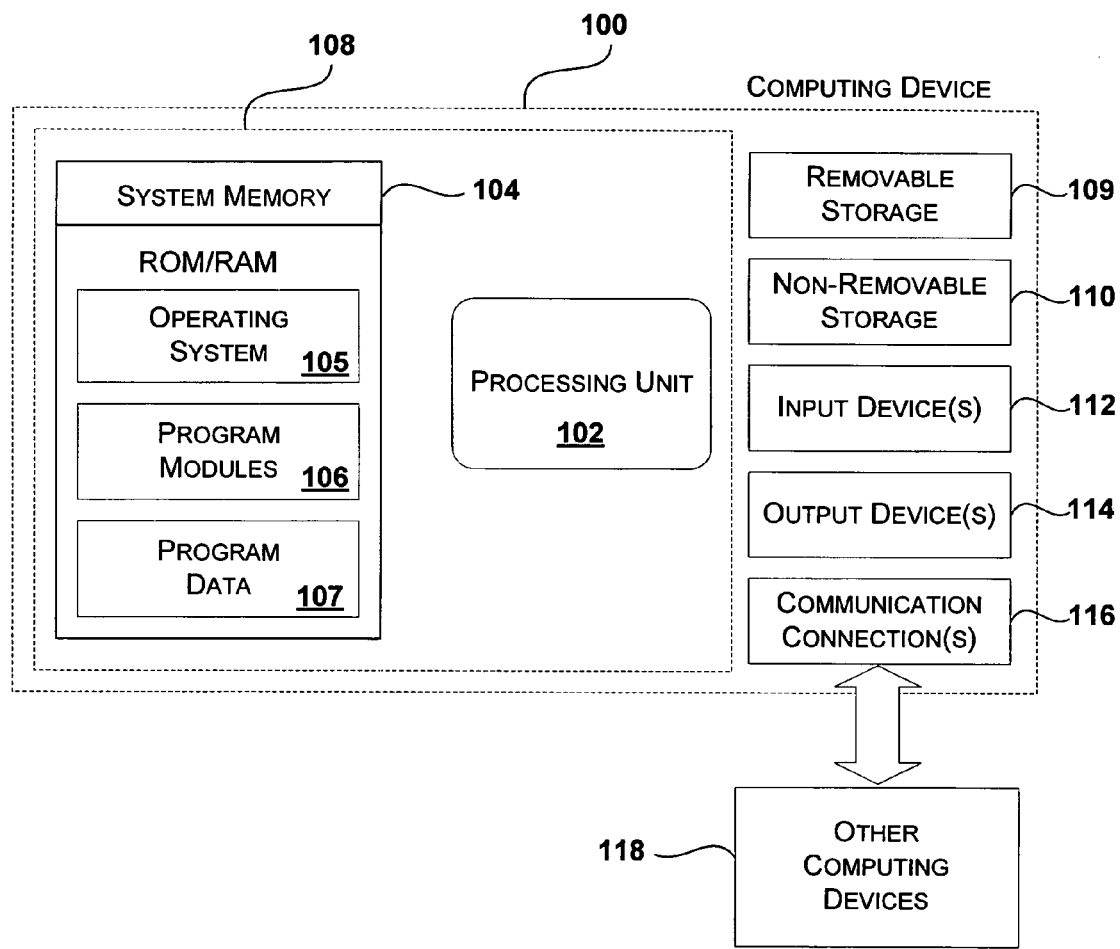
FIG. 1 is an illustrative computer environment that may be used to implement the techniques and mechanisms described herein.

The various embodiments of the present garbage collection technique may be implemented in different computer environments. The computer environment shown in FIG. 1 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 1, one exemplary system for implementing the present garbage collection technique includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connection(s) 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Figure 2:
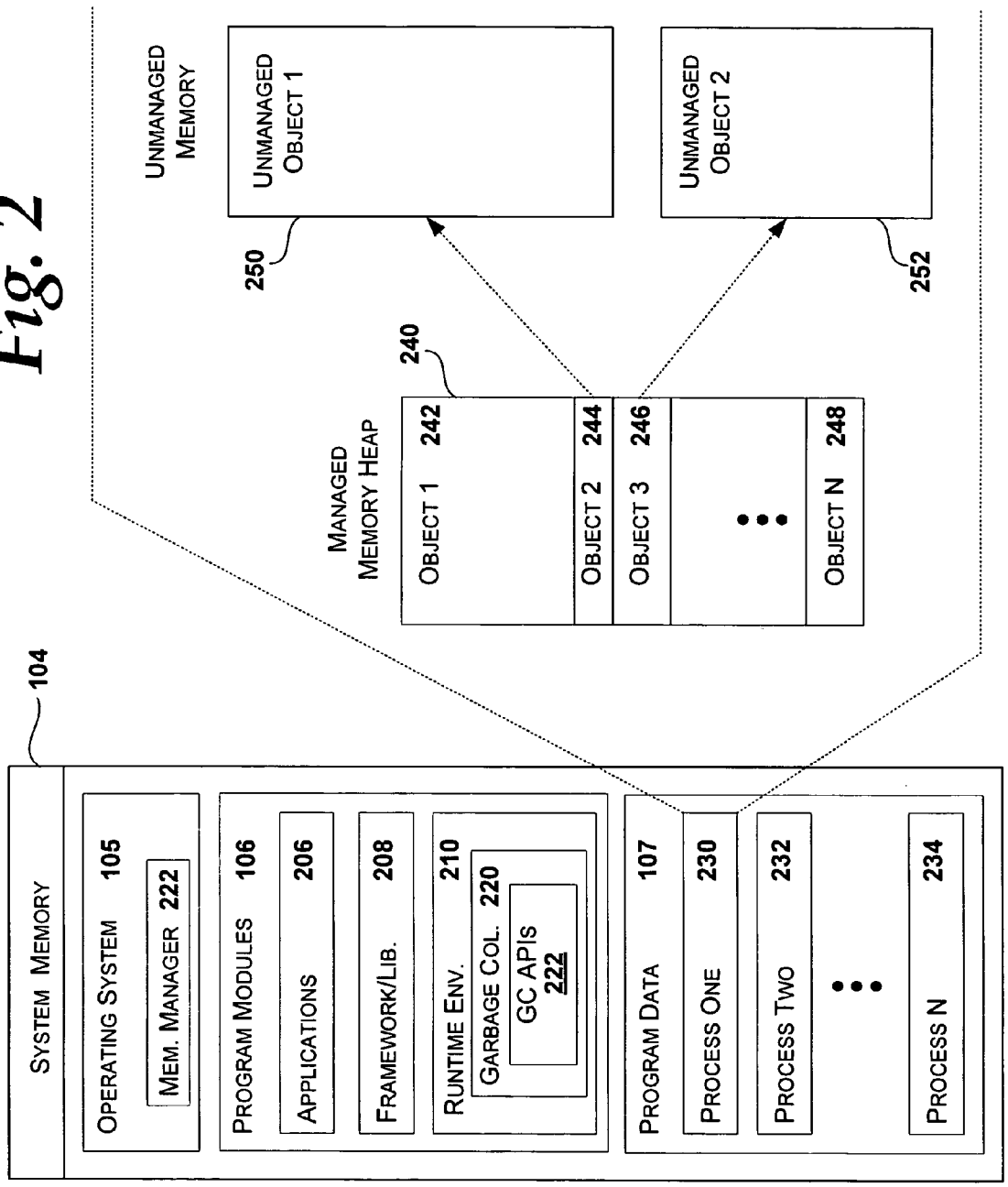
FIG. 2 is a block diagram that further illustrates aspects of the system memory shown in FIG. 1 for implementing the techniques and mechanisms described herein.

FIG. 2 is a block diagram that further illustrates aspects of the system memory 104 shown in FIG. 1 for implementing the techniques and mechanisms described herein. As illustrated in FIG. 1 above, the system memory 104 may include portions of operating system 105, program modules 106, and program data 107. The operating system 105 may include a memory manager 222 that supports the present garbage collection process. Alternatively, the memory manager 222 may be included within a runtime environment 210 or be its own application 206. The program modules 106 include each application 206 that is executing, framework 208, and runtime environment 210. Framework 208 may be a set of libraries or other services. Runtime environment 210 is responsible for performing many services, such as encryption, security, Just-in-Time (JIT) compilation, and others. During runtime, application 206 is executed by utilizing framework 208, runtime environment 210, and operating system 105. The runtime environment 210 provides additional services and may be a cross-platform run-time environment. One of the services provided by the runtime environment 210 that is of interest in the present discussion is garbage collector 220. Before describing garbage collector 220, program data 107 is described.

Program data 107 includes a predetermined amount of memory for each process (e.g., processes 230, 232, and 234). Although each block for processes 230-234 are shown equal sized, the predetermined amount of memory associated with each process may be different. As mentioned above, operating system 105 allots a predetermined amount of memory for each process. If a process attempts to utilize memory over this predetermined amount of memory, the memory manager 222 implements page faults rather than using additional memory. The memory used by a process (e.g., process 230) includes a managed memory heap 240 and one or more unmanaged memory allocations (e.g., unmanaged object 250 and 252). The managed memory heap 240 stores managed objects 242-248. Managed objects 242-248 include static objects, global objects, local variables, pointers, and such for one of the associated applications 206 that is executing or that has executed. One or more of the managed objects (e.g., managed objects 244 and 246) may include a reference to one or more of the unmanaged memory allocations 250 and 252. In FIG. 2, managed object 244 references unmanaged memory allocation 250 and managed object 246 references unmanaged memory allocation 252.

The garbage collector 220 is responsible for reclaiming memory from managed memory heap 240. In general, garbage collector 220 may be any conventional garbage collector that implements some collection strategy in determining how to reclaim memory from managed memory heap 240. The collection strategy attempts to pace the rate of collection (memory reclamation) to keep memory consumption and overhead in good balance. For example, if the collection strategy attempts too many garbage collections, CPU usage becomes too much. In contrast, if the collection strategy does not attempt garbage collections regularly, memory consumption becomes too large. Therefore, in accordance with the present garbage collection mechanism, garbage collector (GC) 220 also includes one or more GC application programming interfaces (APIs) 222. Briefly, described in detail later, GC APIs 222 provide a mechanism for communicating information about the amount of unmanaged memory associated with each managed object on the managed memory heap 240. The garbage collector 220 then utilizes this information when implementing its collection strategy for reclaiming memory from managed memory heap 240 so that memory consumption and CPU overhead are in good balance.

Figure 3:
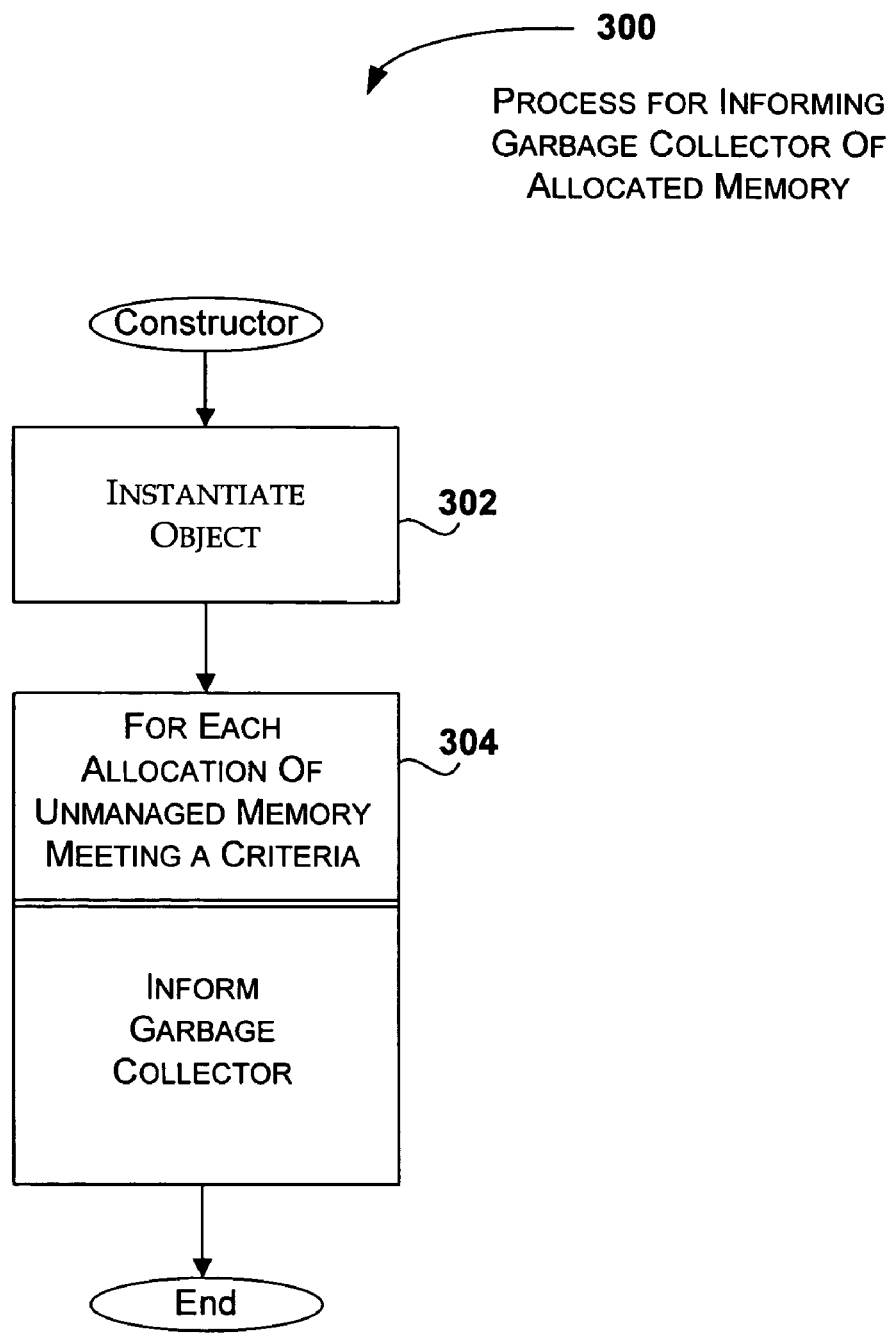
FIG. 3 is a flow diagram illustrating an exemplary process for informing the garbage collector of allocated unmanaged memory.

FIG. 3 is a flow diagram illustrating an exemplary process 300 for informing the garbage collector of allocated unmanaged memory associated with a managed object. Exemplary process 300 is performed in a constructor for the managed object. However, those skilled in the art will appreciate that the present technique may be implemented in various manners to support other implementations of allocating unmanaged memory associated with a managed object. For example, in one embodiment, a programmer may be responsible for adding calls to the GC APIs in a manner that supports the present garbage collection technique. In another embodiment, the calls to the GC APIs may be automatically included whenever a call to allocate unmanaged memory is executed. The exemplary process for informing the garbage collector within a constructor begins at block 302. At block 302, the managed object is instantiated using conventional techniques. Processing continues at block 304.

At block 304, the garbage collector is informed of each allocation of unmanaged memory that meets a certain criteria. One exemplary technique for informing the garbage collector is illustrated by an API shown in FIG. 4. As one skilled in the art will appreciate, the garbage collector may be informed each time unmanaged memory is allocated, one time with the total amount of total amount of allocated unmanaged memory, or the like. In addition, the garbage collector may be informed based on a certain criteria. For example, the criteria may be that the amount of unmanaged memory associated with the managed object is five times the amount of managed memory associated with the managed object. By setting some criteria, the garbage collector does not have to perform additional processing to determine the affect of the unmanaged memory on the collection strategy if the amount of unmanaged memory is unlikely to affect the collection strategy. Thus, informing the garbage collector of the unmanaged memory causes the garbage collector to "add pressure" to the collection strategy associated with the managed object, thereby, causing the managed object to be collected more frequently than without "the pressure". Processing continues to end.

Figure 4:
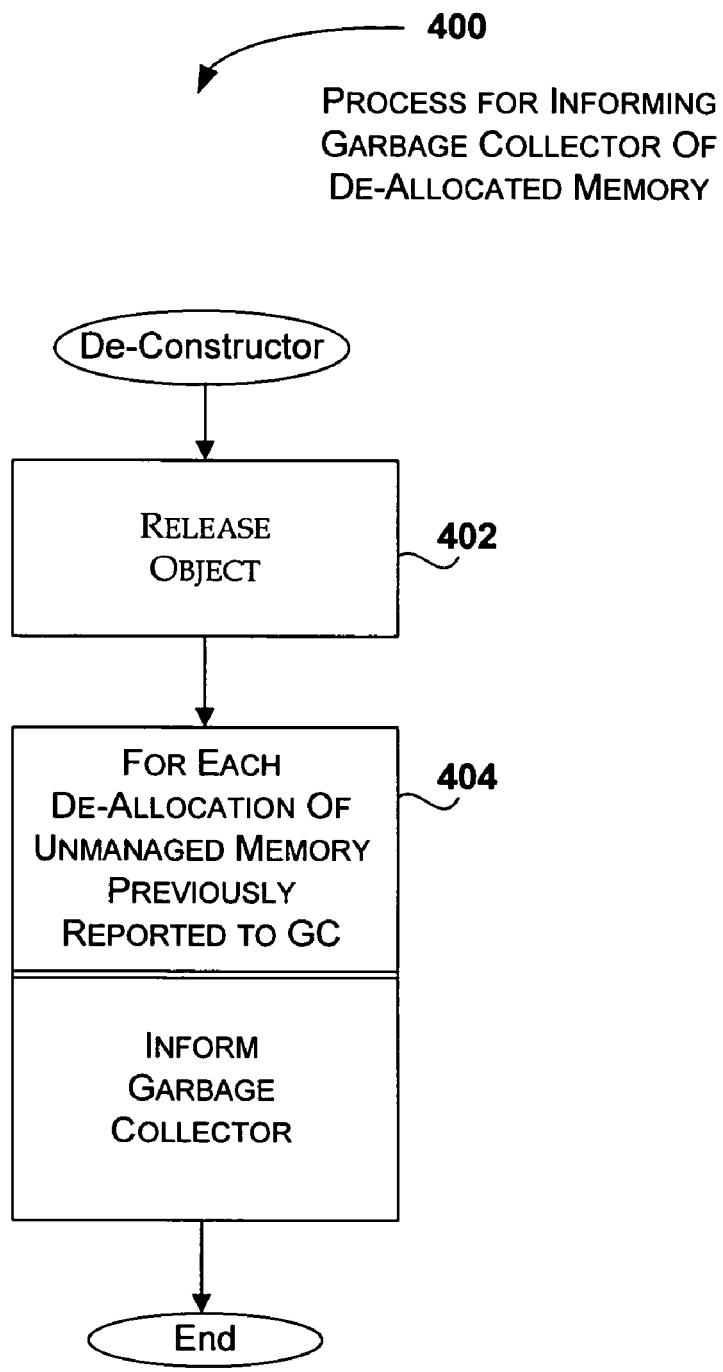
FIG. 4 is a flow diagram illustrating an exemplary process for informing the garbage collector of de-allocated unmanaged memory.

FIG. 4 is a flow diagram illustrating an exemplary process 400 for informing the garbage collector of de-allocated unmanaged memory that has been previously reported to the garbage collector. Exemplary process 400 is performed in a destructor for the managed object. However, those skilled in the art will appreciate that the present technique may be implemented in various manners to support other implementations of de-allocating unmanaged memory associated with a managed object. For example, in one embodiment, a programmer may be responsible for adding calls to the GC APIs in a manner that supports the present garbage collection technique. In another embodiment, the calls to the GC APIs may be automatically included whenever a call to de-allocate unmanaged memory is executed. The exemplary process for informing the garbage collector within a destructor begins at block 402. At block 402, the managed object is released using conventional techniques. Processing continues at block 404.

At block 404, the garbage collector is informed of each de-allocation of unmanaged memory that was previously reported to the garbage collector. One exemplary technique for informing the garbage collector is illustrated by an API shown in FIG. 4. As one skilled in the art will appreciate, the garbage collector may be informed each time unmanaged memory is de-allocated, one time with the total amount of de-allocated unmanaged memory, or the like. It is important to note, that the garbage collector is informed of de-allocated unmanaged memory only for previously reported allocations of unmanaged memory. Processing continues to end.

Figure 5:
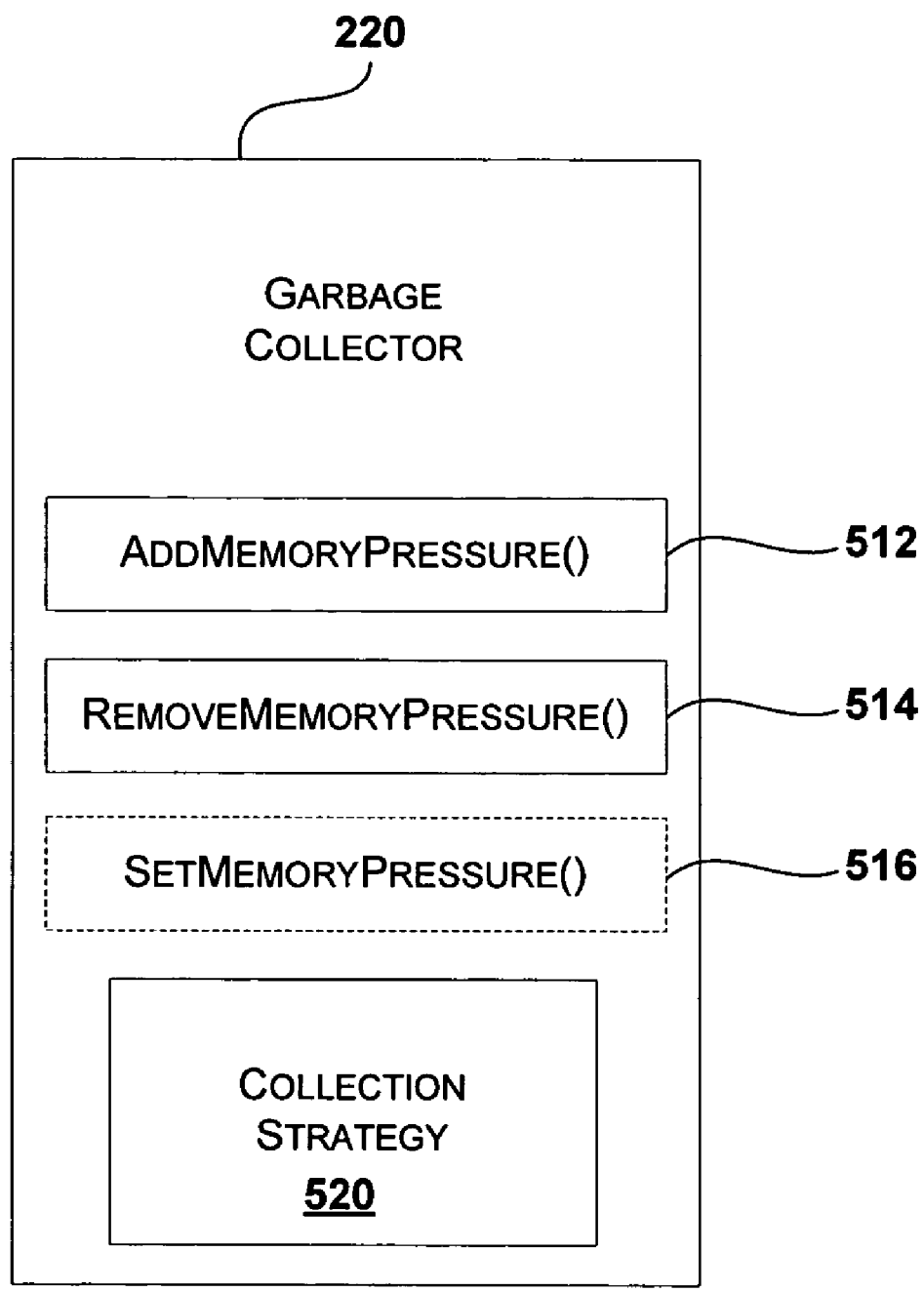
FIG. 5 is a block diagram of an exemplary garbage collector illustrating exemplary application programming interfaces for communicating information about the unmanaged memory usage suitable for use in the flow diagrams of FIG. 3 and FIG. 4.

FIG. 5 is a block diagram of an exemplary garbage collector 220 illustrating exemplary application programming interfaces 512 and 514 for communicating information about the unmanaged memory usage suitable for use in the flow diagrams of FIG. 3 and FIG. 4. In addition, FIG. 5 illustrates an alternate embodiment (shown with dashed box) with one application programming interface 516 for communicating information about the unmanaged memory usage suitable for use in the flow diagrams of FIG. 3 and FIG. 4. Application programming interface 512, named "AddMemoryPressure", accepts a long word storing the number of bytes allocated from the unmanaged memory. Application programming interface 514, named "RemoveMemoryPressure", accepts a long word storing the number of bytes de-allocated from the unmanaged memory. APIs are added to the code within a module in order to implement the present garbage collection technique. The APIs may be added by a programmer, automatically via a library, or the like. For any implementation, the APIs inform the garbage collector 220 about the amount of unmanaged memory associated with a particular managed object so that the collection strategy for the particular managed object may be adjusted as needed. For example, if the amount of unmanaged memory grows, the garbage collector may quicken its collection pace and collect more objects that are holding onto unmanaged memory. In one embodiment, each call to API 512 is cumulative. Therefore, the garbage collector may receive multiple API 512 calls associated with one managed object. The garbage collector then adds the amount of each call to determine the total amount of unmanaged memory associated with the managed object. The total amount of unmanaged memory is then used to determine the affect on the collection strategy. In certain situations, calling API 512 may not affect the collection strategy of the garbage collector. This may occur, for example, when the actual amount of allocated unmanaged memory associated with the managed object is small in comparison to the managed heap.

In the embodiment in which programmers are responsible for adding the calls to APIs 512 and 514 to their constructors and destructors, respectively, programmers are encouraged to call API 512 for any managed object that has a reference to unmanaged memory that is more than five times the amount of memory allocated for the managed object from the managed heap. For smaller ratios, the overhead in reclaiming the associated managed object in relation to the amount of memory reclaimed is not sufficient to make the API 512 worthwhile. In addition, programmers are encouraged to call API 512 for any managed object when an indeterminable amount of unmanaged memory is allocated (e.g., file referenced). The programmers are also encouraged to make the call to API 512 when the unmanaged memory is allocated, typically, during the construction of the managed object. Likewise, programmers are encouraged to make the call to API 514 when de-allocating memory for an unmanaged allocation for which the garbage collector was previously notified using a call to API 512.

The following is a portion of exemplary pseudo-code illustrating an embodiment with APIs 512 and 514:

```
class Bitmap {
  private long __size
  Bitmap ( string path ) {
    __size = new FileInfo(path).Length;
    GC.AddMemoryPressure ( __size );
    // insert additional constructor logic as needed including unmanaged
      allocation
  }
  ~ Bitmap( ) {
    GC.RemoveMemoryPressure ( __size );
    // insert finalization code including de-allocation of unmanaged memory
  }
}
```

The above exemplary pseudo-code illustrates one call to API 512 for one or more allocations of unmanaged memory. The pseudo-code also illustrates one sequence for calling API 512 in relation to the allocation of the unmanaged memory and for calling API 514 in relation to the de-allocation of the unmanaged memory.

In another embodiment (shown within dashed box), instead of two APIs 512 and 514, there may be a single API 516, such as "SetMemoryPressure". The single API minimizes the likelihood of using the API incorrectly. The single API accepts a long word that stores the amount of allocated unmanaged memory and accepts a pointer to the object to which the amount is associated. When the garbage collector receives the amount, it will determine whether or not to re-adjust its weighting system to include the amount in its determination of when to collect the instance. In contrast with the embodiment with two APIs, in the single API embodiment, the "pressure" is automatically removed from the object when the object instance is finalized. By performing the removal of pressure on the user's behalf, the ability to misuse the present garbage collection technique is reduced because forgetting to remove pressure after adding pressure will not occur.

Similar to the API 512, a programmer calls the single API when an instance is created. Preferably, the single API is called when the unmanaged resource associated with the object is first allocated. Typically, this will occur in the constructor. In order to automatically remove the pressure, the object to which the pressure is added includes a finalizer. Then, for any object having a finalizer, the garbage collector automatically removes the pressure that had been added to the managed object. If the single API is invoked on an object without a finalizer, an exception is thrown that indicates an invalid operation. If the single API is called twice, the value specified in the second (i.e., later) call replaces the value specified in the first call. Therefore, unlike the embodiment with two APIs, the calls to the single API are not cumulative.

The following is a portion of pseudo-code illustrating the embodiment with a single API:

```
class Bitmap {
  private long __size
  Bitmap ( string path ) {
    __size = new FileInfo(path).Length;
    // insert additional constructor logic as needed
    GC.SetMemoryPressure( this, __size);
  }
  ~ Bitmap( ) {
    // insert finalization code
  }
}.
```

The above exemplary pseudo-code illustrates one call to API 516 for all the allocations of unmanaged memory. The pseudo-code also illustrates having a finalizer for any managed object that calls API 516.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the present garbage collection technique.

While example embodiments and applications have been illustrated and described, it is to be understood that the present garbage collection technique is not limited to the precise configuration and resources described above. Various modifications, changes, and variations apparent to those skilled in the art may be made in the arrangement, operation, and details of technique disclosed herein without departing from the scope of the claimed invention. Thus, as described, the present technique increases the effectiveness of collection strategies based on the memory consumption of the managed object.

What is claimed is:

1. A computer-implemented method of managing dynamically allocated memory comprising:
   accepting input that indicates an amount of allocated unmanaged memory that is separate from memory that is managed as managed objects on a heap;
   associating the input with a managed object from among the managed objects on the heap; and
   adjusting a collection strategy for collecting the managed object based on the input.

2. The computer-implemented method of claim 1, further comprising collecting the managed object based on the collection strategy.

3. The computer-implemented method of claim 1, wherein the input is supplied during the creation of the managed object.

4. The computer-implemented method of claim 1, further comprising accepting another input that indicates another amount of allocated unmanaged memory associated with the managed object.

5. The computer-implemented method of claim 4, wherein adjusting the collection strategy is based on both inputs.

6. The computer-implemented method of claim 1, further comprising accepting another input that indicates another amount, the other amount indicating the amount of unmanaged memory de-allocated.

7. The computer-implemented method of claim 6, wherein adjusting the collection strategy is based on both inputs.

8. The computer-implemented method of claim 1, wherein the collection strategy attempts to reclaim memory from a plurality of managed objects on the heap based on the total memory associated with each managed object, the total memory comprising heap memory of that managed object and unmanaged memory associated with that managed object.

9. The computer-implemented method of claim 8, further comprising automatically removing the amount corresponding to the total memory that is associated with the managed object when the managed object is destroyed.

10. The computer-implemented method of claim 9, wherein the managed object is destroyed via a destructor.

11. A computer-implemented method of managing dynamically allocated memory, comprising:

allocating an amount of unmanaged memory, the unmanaged memory being associated with a managed object stored on a managed memory heap, wherein the unmanaged memory is separate from the managed memory heap; and informing a garbage collector about the amount of unmanaged memory in a manner that allows the garbage collector to adjust a collection strategy for the managed object based on the amount of unmanaged memory.

12. The computer-implemented method of claim 11, wherein allocating the amount of unmanaged memory occurs during the creation of the managed object.

13. The computer-implemented method of claim 11, wherein allocating the amount of unmanaged memory occurs during a constructor of the managed object.

14. The computer-implemented method of claim 11, wherein the garbage collector is informed of the amount if the amount is a pre-determined multiple of the memory consumed on the managed memory heap for the managed object.

15. The computer-implemented method of claim 11, further comprising allocating another amount of unmanaged memory associated with the managed object and informing the garbage collector about the other amount in a manner that allows the garbage collector to adjust the collection strategy based on both amounts.

16. The computer-implemented method of claim 11, further comprising de-allocating the amount of unmanaged memory and informing the garbage collector about the de-allocation in a manner that allows the garbage collector to re-adjust the collection strategy for the managed object.

17. The computer-implemented method of claim 16, wherein de-allocating the amount of unmanaged memory occurs during execution of a destructor of the managed object.

18. The computer-implemented method of claim 11, further comprising automatically removing the amount of unmanaged memory associated with the managed object when the managed object is destroyed.

19. The computer-implemented method of claim 18, wherein the managed object is destroyed within a destructor.

20. A computer-readable storage medium having computer-executable instructions, that when executed on a computer, cause execution of steps comprising:

accepting input that indicates an amount of allocated unmanaged memory that is separate from memory that is managed as managed objects on a heap;

associating the input with a managed object from among the managed objects on the heap; and adjusting a collection strategy of a garbage collector for collecting the managed object based on the input.

21. The computer-readable storage medium of claim 20, wherein the step of accepting input includes accepting input from an API that includes a first parameter for specifying a size of the allocated unmanaged memory.

22. The computer-readable storage medium of claim 20 further comprising informing the garbage collector of de-allocated unmanaged memory associated with the managed object.

23. The computer-readable storage medium of claim 22, wherein informing the garbage collector comprises using an API that includes a first parameter for specifying a size of the de-allocated unmanaged memory.

24. A system configured to perform garbage collection, the system comprising:

a processor; and a memory into which a plurality of instructions are loaded, the memory having a heap into which a plurality of objects are dynamically allocated and an unmanaged memory area, separate from the heap, into which a plurality of unmanaged memory allocations are allocated, the plurality of instructions performing a method comprising:

accepting input that indicates an amount of allocated unmanaged memory associated with one of the plurality of unmanaged memory allocations;

associating the input with one of the plurality of objects on the heap;

adjusting a collection strategy for collecting the object based on the input; and collecting the object based on the collection strategy.

25. The system of claim 24, wherein the collection strategy attempts to reclaim memory from the object based on the amount of total memory the object consumes, the total memory comprising heap memory and associated unmanaged memory.

* * * * *